Dec. 10, 1929.  H. L. DE ZENG  1,739,027
DIAGNOSTIC INSTRUMENT
Filed July 6, 1925   2 Sheets-Sheet 2
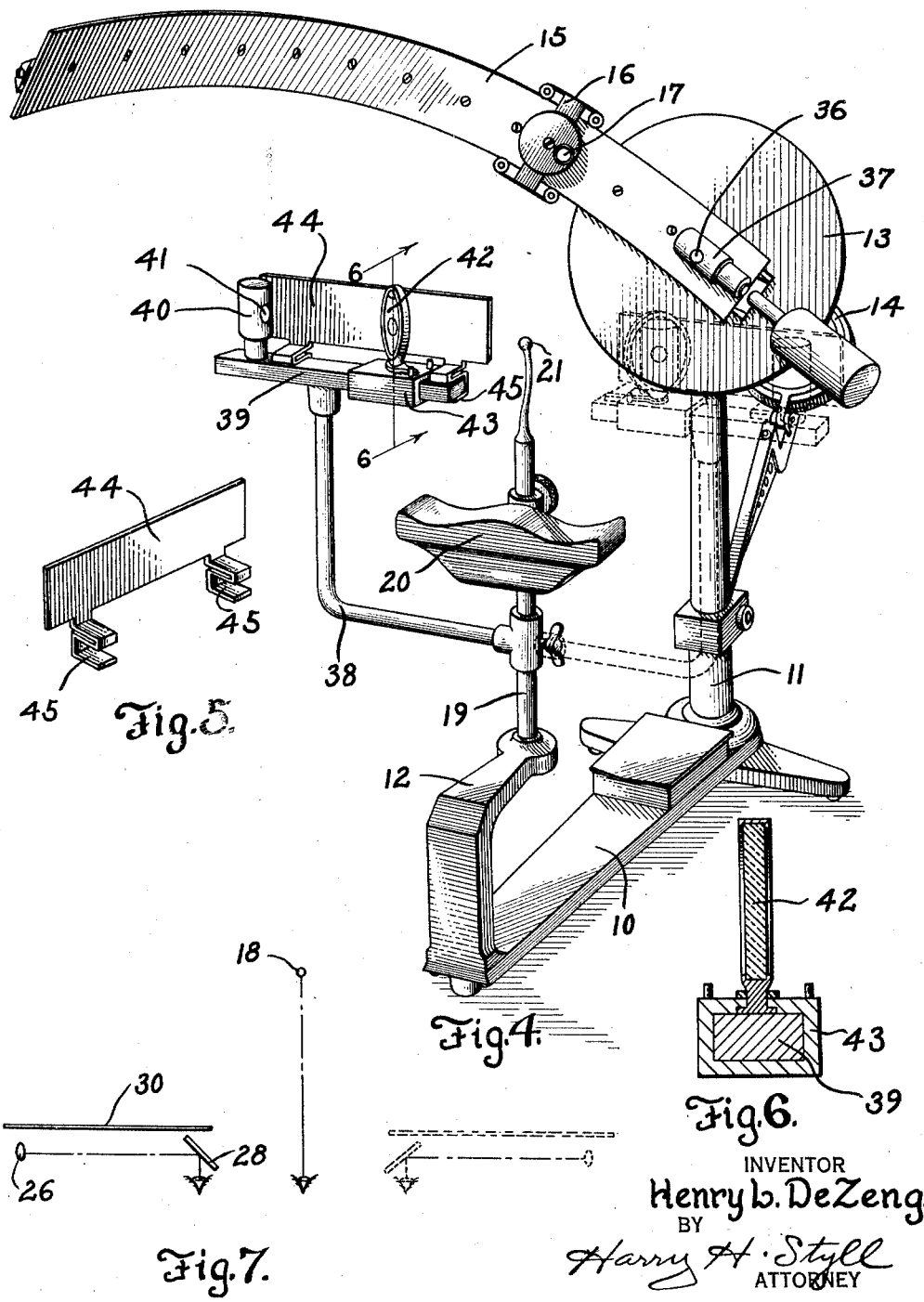
INVENTOR
Henry L. DeZeng
BY
Harry H. Styll
ATTORNEY Patented Dec. 10, 1929

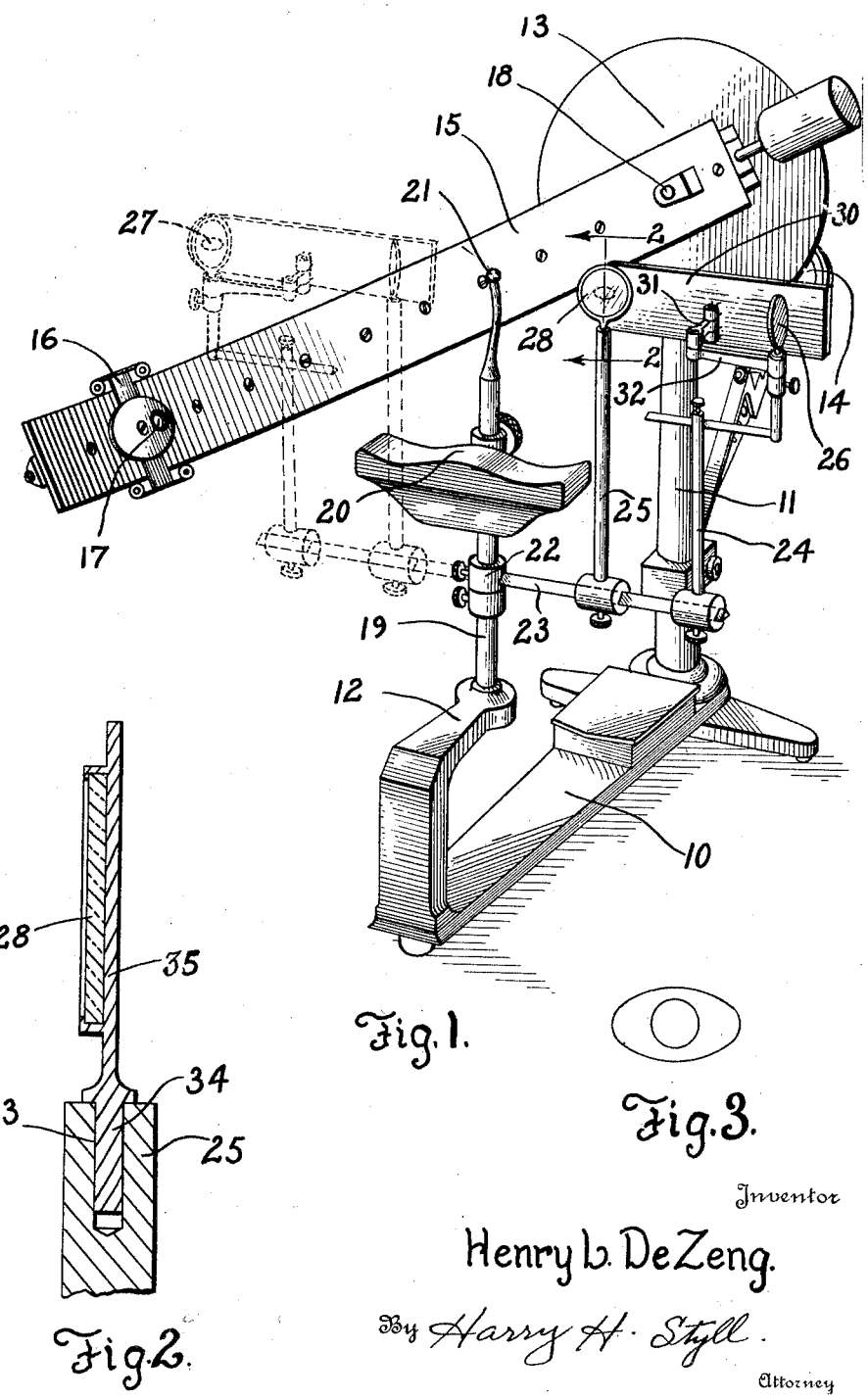

1,739,027

UNITED STATES PATENT OFFICE

HENRY L. DE ZENG, OF GENEVA, NEW YORK, ASSIGNOR, BY MESNE ASSIGNMENTS, TO AMERICAN OPTICAL COMPANY, OF SOUTHBRIDGE, MASSACHUSETTS, A VOLUNTARY ASSOCIATION OF MASSACHUSETTS

DIAGNOSTIC INSTRUMENT

Application filed July 6, 1925. Serial No. 41,749.

This invention relates to improvements in diagnostic instruments, and has particular reference to eye testing instruments, such as perimeters, campimeters, or the like, in the use of which it is necessary that the eye being tested should be held in fixed position. In its broadest aspect the invention comprehends the provision of binocular fixation in connection with methods of and apparatus for eye testing, and while it is herein illustrated and described in connection with a perimeter, it is to be understood that its use is not restricted to this instrument, since it may be applied with equal advantage to any other type of instrument requiring fixation of the eye under test.

A perimeter is an instrument used for measuring and graphically recording the field of vision of a person's eye, and plays an important part in determining visual defects and observing the development of certain ophthalmalogical conditions and the results of treatments therefor. In the use of such devices prior to this invention, the eye under test has been fixed on a stationary point or object at the center of the instrument, while the other eye has been covered with a black opaque disc. A requirement of prime importance in making tests of this character is that the eye under test must not move, but it has been found that the fulfillment of this requirement has been difficult of accomplishment. When the eye is moved during the course of an examination the results obtained are inaccurate and very frequently it has been necessary to repeat the test several times in order to make sure of the findings; such repetition is tiresome for the patient and annoying to the specialist making the examination, and represents lost time and effort.

I have found that the tendency toward "roving" is largely due to the fact that the eye not under test and covered by an opaque disc can see nothing and has a subconscious tendency to find something that it can see. Thus it moves and due to the inter-relation of the muscles of the two eye balls the eye under test moves also. I overcome these objectionable features of the prior art by providing a secondary fixation object to hold the attention of the eye not being tested.

An important object of the present invention is to provide an eye testing instrument with means for binocular fixation.

Another object is to provide such an instrument with independent fixation objects for each eye.

Another object is to provide such a device with a plurality of fixation objects which will be relatively movable, whereby to be readily adjustable to different pupillary distances.

Another object is to provide such a device wherein one fixation object is capable of movement relative to the other, whereby to be capable of testing either eye of a patient.

Another object is to provide such a device wherein the distance value of the fixation objects relative to their respective eyes will be substantially equal.

Another object is to provide such a device which will be particularly adaptable for use in the recording of visual fields.

Other objects and advantages should be readily apparent in the course of the following description when taken in connection with the accompanying drawings and will be specifically pointed out in the appended claims.

In the drawings forming a part of this application,

Figure 1 is a perspective view of a perimeter embodying the invention;

Figure 2 is a detail sectional view on the line 2—2 of Figure 1;

Figure 3 is a diagrammatic view illustrating the superimposed appearance of the two fixation objects as seen by the patient;

Figure 4 is a view similar to Figure 1, and illustrating a modified form of the invention;

Figure 5 is a detail perspective view of an opaque shield used in connection with the secondary fixation object;

Figure 6 is a transverse sectional view on the line 6—6 of Figure 4;

Figure 7 is a diagrammatic top plan view illustrating the use of the invention.

Similar reference characters designate corresponding parts throughout the several views.

Referring particularly to Figures 1, 2 and 3, I have shown a perimeter comprising a base member 10, having a post 11 rising from the rear of the base, and a support 12 at the front of the base. The post 11 supports a rotatable member 13 upon which may be secured a recording mechanism which is adapted to cooperate with a chart holder 14 also carried by the post 11. The details of construction of the perimeter per se are not of the essence of this invention, and are clearly disclosed in my Patent No. 1,115,408 issued on October 27, 1914.

Carried by the rotatable member 13 is an arc or arm 15 which is preferably curved, and upon which is movably mounted a carriage 16 of any ordinary or preferred construction, carrying a test object 17. Disposed in line with the axis of rotation of the member 13 is a fixation object 18, upon which the attention of the patient is to be engaged. As here shown, this fixation object may comprise a relatively small painted spot of a color which will contrast from its background.

It is essential in making a test of this kind that the head of the patient should be immovably held, and in order to facilitate this a standard 19 is carried by the member 12 and supports a longitudinally adjustable chin rest 20, in front of which is a gage member 21, directly over which the patient is intended to sight at the fixation object 18.

It is to be understood that the fixation object 18 is intended for the fixation of the eye under test, and that during the test said eye must not move. In order to facilitate a steady fixation I also provide a means for holding the attention of the eye not under test; a collar 22 is preferably rotatably mounted upon the standard 19 and carries a horizontally disposed supporting arm 23 upon which are longitudinally movable an object support 24 and a reflector support 25. A disc 26 is carried by the object support 24 and has provided on its surface an object or spot 27 of a contrasting color from its background. The disc 26 is preferably disposed as facing the gage member 21, whereas a reflector 28 carried by the support 25 is disposed at an angle directly in front of the eye not being tested. Thus a secondary fixation object is provided which will be laterally disposed from the central fixation object and lying ouside of the field of vision of the eye under test. The supports 24 and 25 are capable of longitudinal adjustment on the supporting bar 23 in order to be accommodated to different pupillary distances.

In order that the second eye may not be disturbed by the movement of the arm 15 during the course of the examination, I may provide an opaque shield 30 which is disposed behind the reflector 28 and the disc 26 and extends from one to the other. This opaque shield 30 is also adjustably mounted upon pivoted arms 31 and 32 so that when the mechanism is swung to the position illustrated in dotted lines in Figure 1 for the testing of the right eye the shield may be accordingly adjusted so as to remain behind the reflector.

In Figure 2, I have shown in more detail the construction of the reflector, wherein the upper end of the supporting member 25 is provided with a central bore 33 in which is mounted a shank 34 of the reflector frame 35 which carries the member 28. In this way the reflector 28 may be swung about the axis of the shank 34 so that it can be adjusted for use on either side of the instrument, as clearly shown in Figure 1.

In the use of the instrument the patient's chin is supported on the chin rest 20, which is adjusted to a suitable height so that the eye to be tested sights directly over the gage member 21, so that the attention is fixed upon the object 18, whereupon the reflector support 25 is adjusted on the bar 23 so as to position the reflector directly in front of the other eye. The secondary object support 24 is then correspondingly adjusted so that the distance from the second eye to the reflector, plus the distance from the reflector to the secondary object is substantially equal to the distance from the eye under test to the object 18. When these parts have been thus properly positioned the fixation objects 18 and 27 appear to be superimposed, as diagrammatically illustrated in Figure 3. A chart is then applied to the instrument in the usual manner, and the visual field is recorded, as is well known to those skilled in the art.

After one eye has been tested, the supporting bar 23 and its associated parts are swung around through an arc of 180 degrees, and the reflector and shield re-adjusted for the testing of the second eye.

In the form of the invention which has been illustrated in connection with Figure 1, a painted spot has been used as a fixation object, but it is to be understood that an illuminated or luminous object may be used just as well. In this connection it is necessary that the secondary fixation object be of the same character as the central fixation object, and preferably dominant over said central object. Thus, in Figure 4 the central or primary fixation object is formed from an opening 36 formed in a lamp housing 37, as has been illustrated and described in connection with my previously mentioned Patent No. 1,115,408. An offset supporting arm 38 is adjustably mounted upon the standard 19 and carries at its upper end a horizontal bar 39, upon which is mounted a second lamp housing 40 having an opening 41 therein, said opening facing an angularly disposed reflector 42. The reflector 42 is mounted upon a slide 43, which is capable of longitudinal movement upon the bar 39. An opaque shield 44 having a pair of depending spring clips 45 is adapted to be positioned behind the reflector and extending from the same to the lamp housing 40. In this form of the invention the lamp housing may be provided if desired with a diaphragm for varying the size of the secondary fixation point, this per se being possible by a number of different forms of diaphragms.

From the foregoing it will be evident that I have provided an improved eye testing apparatus particularly adapted for use in connection with perimeters, etc., wherein binocular fixation is required. It is, of course, to be understood that changes may be resorted to in the minor details of construction and arrangement of the parts, and the right is herein reserved to make such changes as fall within the scope of the appended claims without departing from the spirit of the invention.

I claim:

1. The combination with a perimeter comprising a fixed eye sighting point, a fixed eye fixation point aligned with the eye sighting point, an arcuate arm centered in one plane at the eye sighting point and pivoted for rotation in a plane normal to the first plane about the fixed eye fixation point, a sliding target on the arcuate arm, of a movable eye fixation object positioned at one side of the line through the fixed eye fixation object and the eye sighting point, a movable mirror alignable with the eye not in line with the fixed fixation object and alignable with the movable fixation object whereby the said eye will see the movable fixation object in the said mirror, and a shield between the eye out of the line of the eye sighting point and the fixed fixation object and between the mirror that is aligned therewith and the fixed fixation object whereby the eye out of line cannot see the fixed fixation object.

2. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector, means to move the target support longitudinally on the arm support, and means to move the reflector support longitudinally on the arm support.

3. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector, means to move the target support longitudinally on the arm support, means to move the reflector support longitudinally on the arm support, and means for pivoting the target support so that it may be swung in a plane normal to the axis of the arm support.

4. In a device of the character described, a head support for fixing the eye position of the eye under test, a member having a fixation object positioned in front of the eye under test and aligned therewith, an arm support positioned to one side of the eye position and extending in a direction laterally away from said eye position and at an angle to the aligned sight line of the eye under test, a reflector support on the arm support, a reflector on the reflector support aligned with the eye not under test, a target support on the arm support spaced from the reflector support, a member having a fixation object on the target support and aligned with the reflector, means on said target support for moving the target support longitudinally on the arm support, and means for moving the fixation object member towards and away from the reflector.

5. In a device of the character described, a head support for fixing the eye position of the eye under test, a member having a fixation object positioned in front of the eye under test and aligned therewith, a support positioned to one side of the eye position and extending in a direction laterally away from said eye position and at an angle to the aligned sight line of the eye under test, a reflector on said support aligned with the eye not under test, a member having a fixation object carried on said support and spaced from and aligned with the reflector, and means for moving the reflector towards and away from the member having the fixation object.

6. In a device of the character described, a head support for fixing the eye position of the eye under test, a member having a fixation object positioned in front of the eye under test and aligned therewith, a support positioned to one side of the eye position and extending in a direction laterally away from said eye position at an angle to the aligned sight line of the eye under test, a reflector on said support aligned with the eye not under test, a member having a fixation object on said support spaced from and aligned with said reflector, means for moving the reflector towards and away from the member having the fixation object, and means for moving the fixation object towards and away from the reflector.

7. In a device of the character described, a head support for fixing the eye position of the eye under test, a member having a fixation object positioned in front of the eye under test and aligned therewith, a support positioned to one side of the eye position and extending in a direction laterally away from said eye position at an angle to the aligned sight line of the eye under test, a reflector on said support aligned with the eye not under test, a member having a fixation object on said support spaced from and aligned with said reflector, means for rotating the reflector about an axis perpendicular to the support, and means for rotating the member with the fixation object about an axis normal to the support.

8. In a device of the character described, a head support for fixing the eye position of the eye under test, a member having a fixation object positioned in front of the eye under test and aligned therewith, a support positioned to one side of the eye position and extending in a direction laterally away from said eye position at an angle to the aligned sight line of the eye under test, a reflector on said support aligned with the eye not under test, a member having a fixation object on said support and aligned with and separated from said reflector, means for swinging said reflector about the support as a pivot in a plane perpendicular to the axis of the support, and means for swinging the member having the fixation object about an axis perpendicular to the support.

9. In a device of the character described, a head support, an eye sighting point on the head support, a member having a fixation object aligned with the eye sighting point, an arm support positioned to one side of the eye sighting point and extending in a direction laterally away from said eye position and at an angle to the aligned sight line of the eye under test, a reflector on the arm support aligned with the eye not under test, a member having a fixation object carried on said support and spaced from and aligned with the reflector, and means for adjusting the fixation object longitudinally on the support.

10. In a device of the character described, a head support, an eye sighting point on the head support, means on the head support to vary the position of the eye under test relative to the eye sighting point, an arm support positioned to one side of the eye sighting point and extending in a direction laterally away from said eye position and at an angle to the aligned sight line of the eye under test, a reflector on the arm support aligned with the eye not under test, a member having a fixation object carried on said support and spaced from and aligned with the reflector, and means for adjusting the fixation object longitudinally on the support.

HENRY L. DE ZENG.